Sept. 24, 1935.  O. D. NORTH ET AL  2,015,122
COUPLING FOR TRACTOR AND TRAILER UNITS OF MOTOR VEHICLES
Filed Nov. 7, 1933   3 Sheets-Sheet 1
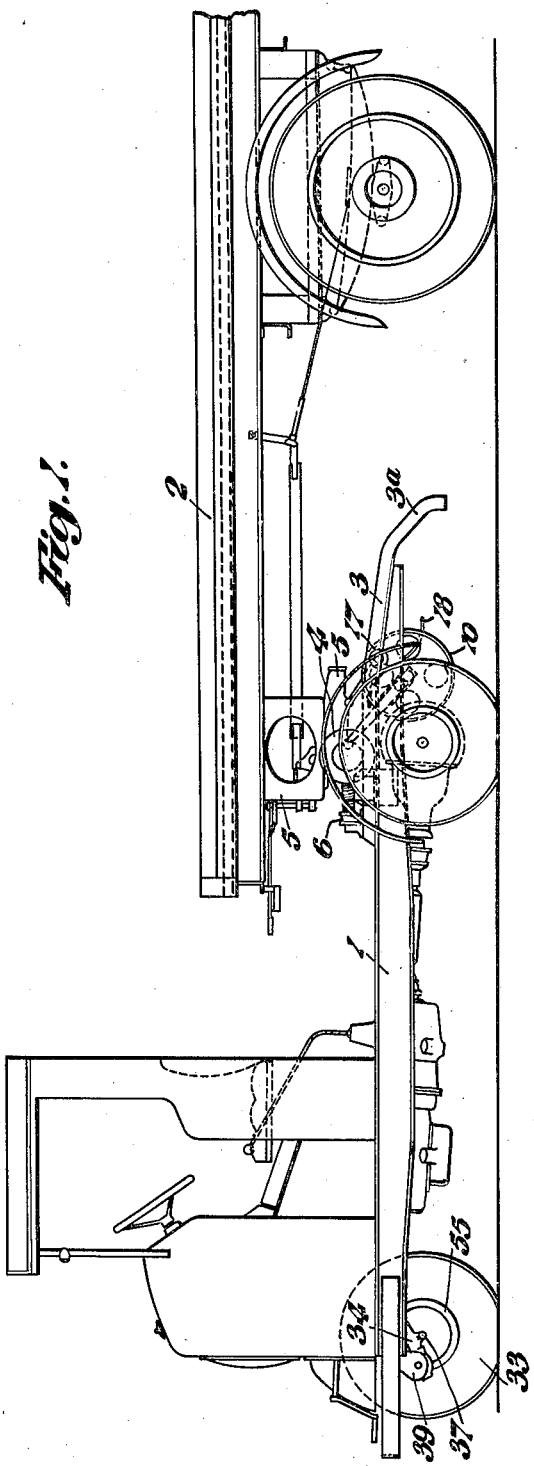
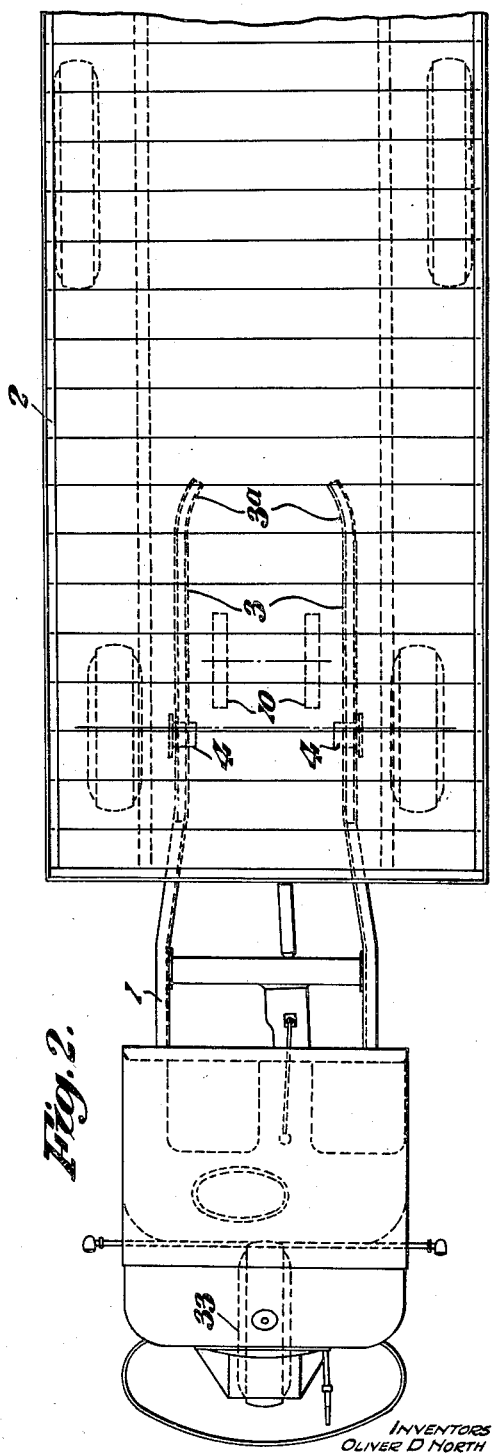
INVENTORS
OLIVER D NORTH
PERCY G HUGH

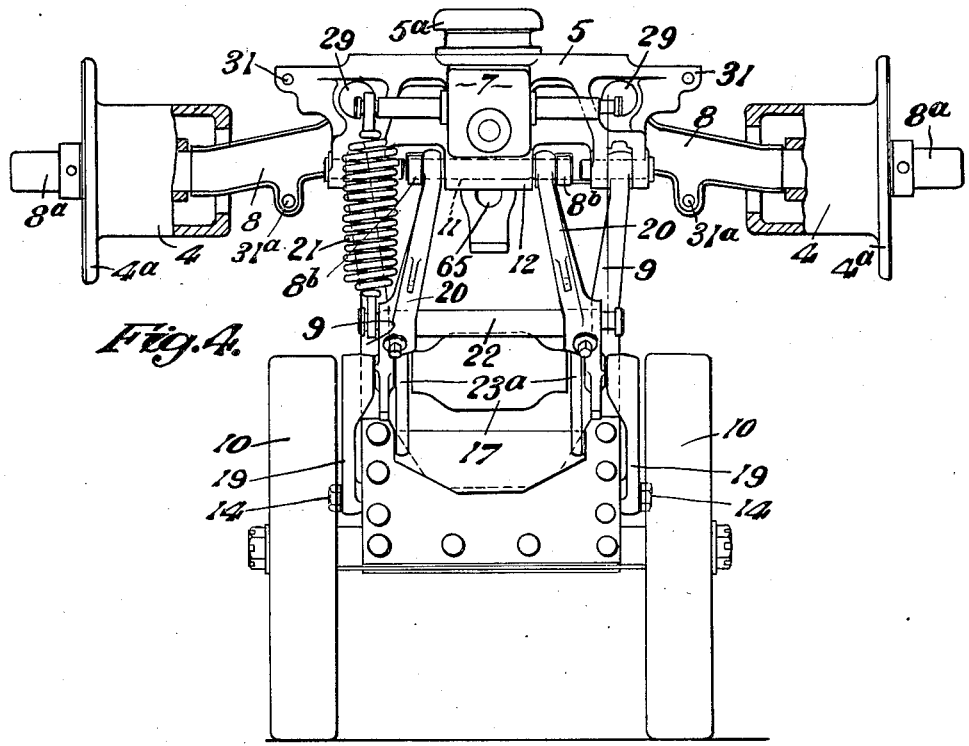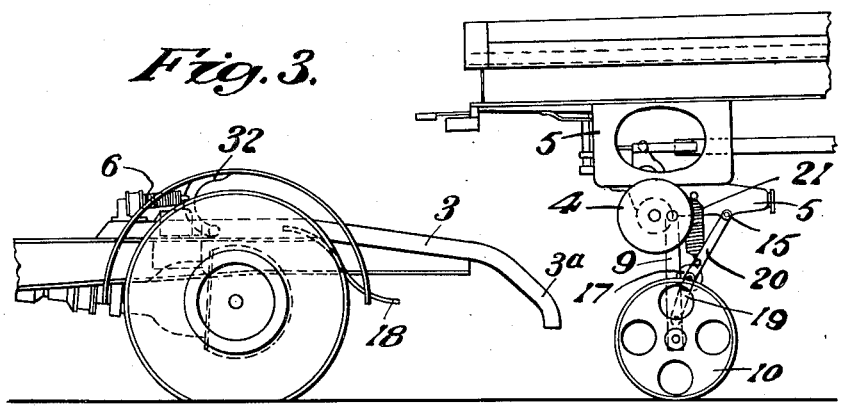

Sept. 24, 1935.  O. D. NORTH ET AL  2,015,122
COUPLING FOR TRACTOR AND TRAILER UNITS OF MOTOR VEHICLES
Filed Nov. 7, 1933   3 Sheets-Sheet 3
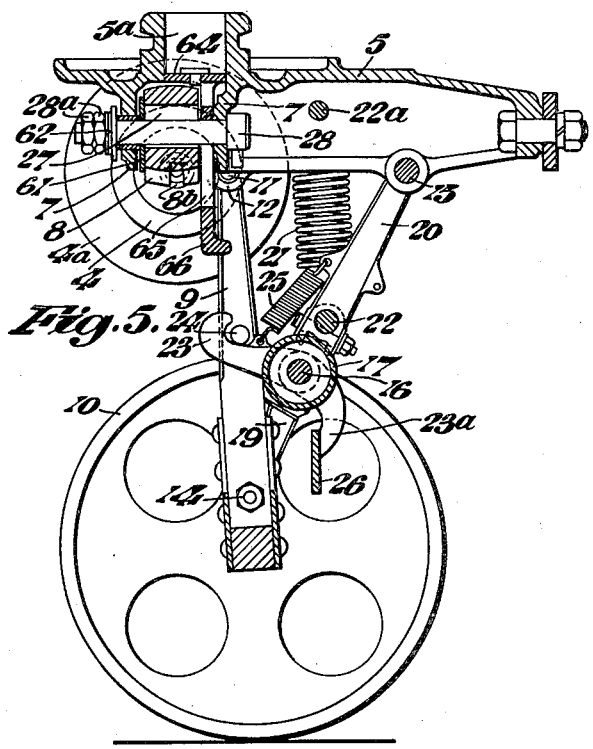
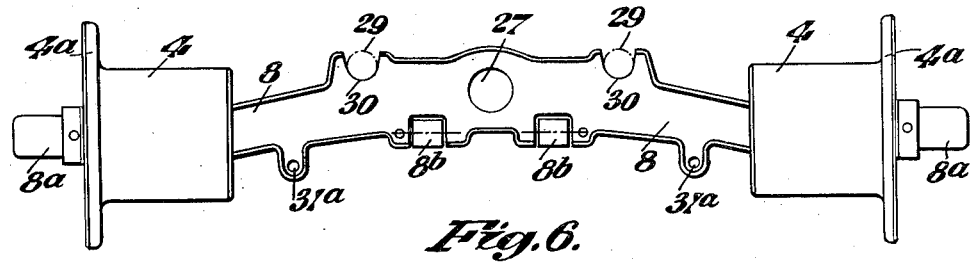

Patented Sept. 24, 1935

2,015,122

UNITED STATES PATENT OFFICE 2,015,122

COUPLING FOR TRACTOR AND TRAILER UNITS OF MOTOR VEHICLES

Oliver Danson North and Percy Garibaldi Hugh, London, England, assignors to Scammell Lorries Limited, London, England Application November 7, 1933, Serial No. 696,938
In Great Britain November 10, 1932

7 Claims. (Cl. 280—33.1)

This invention relates to an improved coupling for tractor and trailer units of motor vehicles and has for its object to provide a simple and effective form of coupling whereby the tractor and trailer units of a motor vehicle may be coupled together by bringing the two portions into line and moving them relatively to each other so that the forward portion of the trailer will be lifted onto and supported by a portion of the tractor where it will be locked in position either automatically or by manually controlled locking means. The operation of raising the front portion of the trailer onto the tractor also lifts temporary supporting wheels on which the front of the trailer rests when not coupled up to the tractor. In the reverse operation of uncoupling the trailer from the tractor the locking device is released and the front portion of the trailer is lowered from the tractor whilst the temporary supporting wheels are again brought into position to support the front of the tractor on the ground.

According to this invention mechanism for coupling a tractor and trailer is characterized by the provision of means with the coupling automatically compensating for differences in inclination or plane of the two vehicles when they are being coupled.

Briefly the preferred form of coupling mechanism according to our invention comprises a pair of longitudinally disposed ramps on the tractor, a turntable on the trailer, a transversely disposed beam oscillatably carried by the trailer, the ends of the beam being adapted to engage and travel along said ramps when the two vehicles are brought toegther for coupling, an abutment on the tractor and an auxiliary wheel carrying structure relatively movably carried by the trailer adapted to be raised by engagement of a part thereof with said abutment, and means permitting of such engagement for various lateral inclinations of the one vehicle relatively to the other.

In order that our invention may be clearly understood and readily carried into effect we have appended hereto three sheets of drawings illustrating an embodiment thereof, and wherein:—

Fig. 1 is a side elevation view showing the tractor and trailer coupled.

Fig. 2 is a plan view of Fig. 1.

Fig. 3 shows the rear and front ends of the tractor and trailer respectively when uncoupled.

Fig. 4 is a part sectional rear elevation view of the trailer.

Fig. 5 is a sectional side elevation view of Fig. 4 showing more particularly the coupling mechanism and the means for locking and releasing the auxiliary wheels of the trailer.

Fig. 6 is a detail front elevation view showing the means with the coupling mechanism for compensating for relative rocking motions of the tractor and trailer.

Referring to the drawings the tractor and trailer are indicated generally by the reference numerals 1 and 2 respectively and they are adapted to be coupled by backing the tractor into the front end of the trailer for which purpose the rear portion of the tractor is provided with a pair of ramps 3, 3 the rear ends of which are inclined downwardly as indicated at 3a and which are adapted to engage with suitable rollers 4 on the front part of the trailer 2 preferably mounted on or supported by a turntable 5 upon which the forward end of the trailer is supported and about which it may swivel. The ramps 3 are mounted on or form a part of the tractor frame and project rearwardly from the ends thereof. At a convenient point on these ramps, preferably at or near the front ends thereof, are provided suitable buffers or stops 6 to limit the extent which the rollers or other abutments on the trailer may move along the ramps. These buffers or stops are preferably resiliently mounted or provided with soft or resilient portions to engage the roller or other abutments on the trailer.

In a convenient arrangement the centre portion of the turn-table is pivotally secured beneath the forward end of the trailer 2 and is provided with suitable brackets or supporting members 7 in which is mounted a transverse beam 8. Upon this beam are mounted the roller abutments 4 which are adapted to engage and ride over the ramps 3 on the tractor. The rollers may conveniently be formed with flanges 4a on one or both sides and the ends of the ramps may be tapered so as to facilitate engagement between the rollers and the ramps. Depending from the portion of the turn-table which is pivotally connected to the front of the trailer are provided suitable struts or legs 9 which in turn support temporary road wheels 10 adapted to be brought into a convenient position to engage the ground and support the front of the trailer when not coupled up to a tractor. These struts or legs 9 may conveniently be hinged or journalled upon the transverse beam supporting the roller abutments or as shown may be mounted upon a separate shaft 11 supported in a sleeve 12 disposed across the base of the turn-table 5. When the trailer is not coupled up to a tractor these struts or legs 9 are turned about their bearings so as to lower the supporting wheels 10 onto the ground and the struts or legs 9 then preferably adopt a substantially vertical position as shown in Fig. 5. The struts or legs are also connected to the rear portion of the turn-table 5 by means of two pairs of hinged elbow links the lower ones 19 of which are pivotally connected by a pin or bolt 14 to the struts or legs whilst the others 20 are pivotally connected to the turn-table as at 15, the free ends of the two links being pivoted together as at 16. The links 19 and 20 may then act as a toggle locking device to retain the struts or legs 9 carrying the wheels in position for supporting the trailer when the pivots 14, 15 and 16 would be in line. They also serve as a means for lifting and lowering the struts or legs during the coupling or uncoupling of the tractor or trailer. For this purpose the links may be arranged in symmetrical pairs with a roller 17 or other abutment mounted upon the pivot 16 which connects them together, and this roller is adapted to engage a curved or otherwise suitably shaped longitudinally centrally disposed lifting and lowering rail 18 mounted on or supported by the tractor. This lifting or lowering rail may comprise a suitable bar or strip of convenient section preferably bent to an elongated S form as shown in Fig. 3 and mounted upon a convenient part of the tractor so that when the tractor and trailer are brought together for coupling purposes the roller 17 on the hinged links will engage with the rail. This preferably takes place after the roller abutments 4 on the turn-table of the trailer have engaged and are supported by the ramps 3 on the tractor. Further movement between the tractor and trailer so as to bring them together for coupling purposes will cause the rail 18 on the tractor to press back the roller 17 located at or near the pivot point between the hinged links 19, 20. This will cause the hinge links to turn about their pivots whilst the roller 17 or other abutment rides on the rail 18, the combined effect being to cause the hinged links 19 and 20 to fold up, turning the struts or legs about their hinge connection 11 to the turn-table 5 of the trailer so as to raise the wheels supported by their lower ends. The relative movement between the tractor and trailer continues until the rollers 4 on the turn-table of the trailer engage with the buffers or stops 6 on the tractor. At this position the pivotal connection 14 of the lower of the hinged links connected to the struts or legs 9 will be located at a position corresponding substantially with the centre of an arcuate portion of the lifting or lowering rail 18 with which the roller 17 on the hinged links engages. Any relative movement which takes place between the tractor and trailer when they are locked in the engaged position will then simply cause the roller to ride along the arcuate portion of the lifting and lowering rail without causing any appreciable movement of the struts or legs carrying the wheels which support the trailer when not coupled to a tractor.

In order to lock the tractor and trailer in the coupled positions, suitable hook-like catches may be provided on the tractor and these hook-like catches are adapted to engage with rollers 8b supported in the transverse beam 8. The hook-like catches on the tractor may either be spring operated to ensure engagement or may be manually controlled for this purpose. In a convenient arrangement the hook-shaped members 8c may be pivoted on a transverse axis 8d on the tractor and projecting rearwardly so that their ends may engage appropriate portions 8b of the transverse beam on the trailer described above. The hook-shaped members may be two in number and may be connected together as a unit and pivotally mounted on a portion of the tractor. The transverse beam may be provided with its rollers 8b at the parts at which the ends of the hook-shaped members engage and these ends are shaped so that they will be moved against the action of suitable strong springs 8e to permit the hooks to engage with the rollers. The inner faces of the hooks are preferably slightly undercut 8f to ensure positive engagement and to prevent accidental release. A suitable releasing lever is provided for moving the hook-shaped members so as to release their ends from the rollers on the transverse beam when it is desired to uncouple the tractor and trailer. This may comprise a cranked lever 8g pivoted at one end beneath a forwardly projecting arm 8h secured to or forming part of the hook-shaped members. The other end of the lever is connected by means of a rod 8i to a suitable operating lever, pedal or the like placed in a convenient position for actuation by the driver of the tractor. A portion of the lever is cam shaped 8j to engage the arm of the hooked shaped members and is arranged to provide a varying degree of leverage at various positions of its movement. The arrangement may be such as to give a high degree of leverage at the commencement to release the hooks from the rollers and a lesser leverage and quicker movement thereafter as an extension 8k on the lever 8g engages underneath the part 8h.

The reverse operation of uncoupling the tractor from the trailer simply consists in releasing the locking catches and driving the tractor slowly in a forward direction. The trailer is preferably held stationary by the application of brakes to the trailer wheels or other suitable means and the tractor will therefore move away from it, the ramps 3 on the tractor sliding beneath the roller or other abutments on the trailer turntable. As the ramps 3 are withdrawn the forward end of the trailer will be lowered owing to the downward inclination of the end of the ramps. At the same time the roller 17 on the hinged links 19, 20 will move downwardly along the raising and lowering rail 18 causing the links to move toward a straightened-out position and at the same time lowering the struts or legs and the trailer supporting wheels thereon. In order to ensure that the hinged links and the struts or legs will be brought to and locked in a position to support the front end of the trailer, a part of the ramps or the lowering and raising rail may be arranged to engage with the legs or the struts so as to straighten the struts out. Suitable strong tension springs 21 are arranged between the hinged links 20 and the turn-table so as to ensure that they will be brought substantially into line with each other to positively lock the hinged struts or legs 9 in the supporting position, these springs being connected to the ends of a transverse rod 22 connected across the upper links 20 and to a transverse rod 22a carried by turn-table.

The location and axial dimension of the roller 17 enables it to be engaged with the rail 18 should one of the vehicles be inclined laterally relatively to the other.

To prevent the links 19 and 20 from being folded so as to cause collapse of the wheel carrying legs 9 when the uncoupled trailer is pushed forwards a pair of hooks 23 are pivoted on the pivot member 16 and are formed with their hooks foremost adapted to trip under and engage around lateral projections 24 on the sides of the legs 9, coiled tension springs 25 connected across these hooks and the links 20 ensuring this engagement. These hooks are disengaged when the tractor is backed into and coupled to the trailer by the centre rail 18 of the tractor striking a transverse plate 26 connected across depending rearward extensions 23a of the hooks 23.

In order to ensure the tractor and trailer being readily coupled when on irregular or laterally sloping ground it is desirable to arrange the member 8 carrying the ramp engaging rollers 4 so that it readily adapts itself to differences in levels of the two vehicles. Also it is desirable that this adjustment should be free to operate when the two vehicles are coupled to obviate excessive torsional stresses on the frame members of the vehicles. For this purpose the beam 8 is supported in such manner that it will take the tension of the coupling and will move relatively to the trailer turntable the requisite amount to compensate for variations in the relative angular positions of the two vehicles. For this purpose the beam 8 is formed as a transverse beam of girder section and with spigoted ends 8a to take the rollers 4 and the centre of this beam is loosely coupled to the turntable 5.

The preferred method of mounting the beam 8 consists in forming a central circular aperture 27 in the beam to receive but quite loosely fit a coupling bolt 28 passed through the lugs 7 depending from the turntable 5. By this means the beam 8 is free to move relatively to the turntable of the trailer such relative movement being about either one of a pair of stout bosses or pins 29 located equi-distantly each side of the bolt 28 and carried by the turntable 5, the beam being provided with substantially semi-circular or U shaped recesses 30 in its upper edge to form seatings for these pins 29. By this means when the ends of the beam 8 are firmly supported by the rollers 4 and the ramps 3 the trailer is free to tilt sideways relatively to the tractor an amount corresponding to the angle which the aperture 27 will permit either end of the beam 8 to swing about either pin 29. If desired coiled tension springs can be connected across lugs 31 and 31a on side wings of the turn-table 5 and on the beam 8 respectively to normally maintain both pins 29 firmly seated in the recesses 30.

The pair of buffers 6 may be coiled compression springs engaging arcuate abutments 32 (Fig. 3) pivoted on a transverse axis on the ramps 3 so as to act as abutments against which the rollers 4 engage. These abutments 32 and the springs 6 resiliently absorb the shock of engaging the parts during coupling of the tractor and trailer.

Brake mechanism of the trailer more particularly described in co-pending patent application No. 696,937 can be operated by the vertical reciprocation of a cylindrical member 64 slidable in a hollow king pin 5a of the turn-table, the upper end of this member 64 seating against a suitable brake lever member and the lower end being forked or slotted as at 65 to clear the bolt 28 and formed with a seating 66 against which is adapted to align and to be pressed a brake operating lever carried by the tractor. By this means the brakes of the trailer do not require to be disconnected when the vehicles are uncoupled or vice versa.

We claim:—

1. Mechanism for coupling a tractor and trailer of the kind set forth comprising a pair of longitudinally disposed ramps on the tractor, a turntable on the trailer, an abutment on the tractor, an auxiliary wheel at the front end of the trailer, a pair of arms pivoted at one end to the turntable and carrying at their other end the trailer auxiliary wheel, a transverse roller like member being disposed across said arms and adapted to engage said abutment when the vehicles are being coupled to cause said arms to swing upwards to raise the said auxiliary wheel off the ground, a pair of links adapted to combine to act as a brace to hold said arms in the trailer supporting position with the auxiliary wheel on the ground, said pair of links being pivoted together at opposed ends and hinged one to the turntable and the other to said arms, a tension spring being connected across one of said links and the turntable for maintaining the links in linear alignment to form a stay for said arms, members carried by the turntable adapted to travel up said ramps, trailer retaining means on the tractor and members carried by the trailer adapted to be engaged by said means for coupling the trailer to the tractor.

2. Mechanism for coupling a tractor and trailer of the kind set forth comprising a pair of longitudinally disposed ramps on the tractor, a turntable on the trailer, an abutment on the tractor, an auxiliary wheel at the front end of the trailer, a pair of arms pivoted at one end to the turntable and carrying at their other end the trailer auxiliary wheel, a transverse roller like member being disposed across said arms and adapted to engage said abutment when the vehicles are being coupled to cause said arms to swing upwards to raise the said auxiliary wheel off the ground, a pair of links adapted to combine to act as a brace to hold said arms in the trailer supporting position with the auxiliary wheel on the ground, said pair of links being pivoted together at opposed ends and hinged one to the turntable and the other to said arms, a tension spring being connected across one of said links and the turntable for maintaining the links in linear alignment to form a stay for said arms, members carried by the turntable adapted to travel up said ramps, trailer retaining means on the tractor and members carried by the trailer adapted to be engaged by said means for coupling the trailer to the tractor, and a beam oscillatably carried by the turntable adapted to travel up said ramps to initially raise said auxiliary wheel off the ground to permit the wheel to be swung to the inoperative position.

3. Mechanism for coupling a tractor and trailer of the kind set forth comprising a pair of longitudinally disposed ramps on the tractor, a turntable on the trailer, an abutment on the tractor, an auxiliary wheel at the front end of the trailer, an arm carrying the auxiliary wheel relatively movably carried by the trailer and adapted to be raised by engagement of a part thereof with said abutment, means permitting of such engagement for various lateral inclinations of one vehicle relatively to the other, a pair of links hinged together and to the turntable and said arm for holding said auxiliary wheel carrying arm in the trailer supporting position, spring means for maintaining said links in such relative positions as to act as a brace for said arm when in the trailer supporting position, a locking arm pivoted to said links, a hooked shape end on said locking arm, a projection on said arm adapted to be engaged by said hook shaped end, spring means adapted to trip the hook shaped end over said abutment when the auxiliary wheel assumes the trailer supporting position, a beam carried by the trailer adapted to travel along said ramps and coupling members on the tractor adapted to engage said beam to couple the trailer to the tractor.

4. Mechanism for coupling a tractor and trailer of the kind set forth comprising a pair of longitudinally disposed ramps on the tractor, a turntable on the trailer, an abutment on the tractor, an auxiliary wheel at the front end of the trailer, a pair of arms pivoted at one end to the turntable and carrying at their other end the trailer auxiliary wheel, a transverse roller like member being disposed across said arms and adapted to engage said abutment when the vehicles are being coupled to cause said arms to swing upwards to raise the said auxiliary wheel off the ground, a pair of links adapted to hold said arms in the trailer supporting position with the auxiliary wheel on the ground, said pair of links being hinged together at opposed ends and hinged one to the turntable and the other to said arms, a tension spring being connected across one of said links and the turntable for maintaining the links in linear alignment to form a stay for said arms, a locking arm pivoted to said links, a hook on one end of said locking arm, a projection on one of the auxiliary wheel carrying arms adapted to receive said hook when the auxiliary wheel is in the supporting position, a spring acting on said locking arms to trip said hook over said projection, an abutment extending from said locking arm, and a longitudinal rail carried by the tractor adapted, when the vehicles are being coupled, to engage said abutment and to fold said links to free the auxiliary wheel for folding to an idle position, a beam carried by the trailer adapted to travel along said ramps and coupling members on the tractor adapted to engage said beam to couple the trailer to the tractor.

5. In a combined tractor and trailer, coupling mechanism comprising a pair of longitudinal ramps at the rear of the tractor, a transversely disposed beam mounted between its ends for oscillation at the front end of the trailer, rollers at the ends of said beam adapted to travel along said ramps, a frame depending from the front of the trailer and carrying a road wheel, bracing links connected across said frame and part of the trailer body, an oscillatable locking member for locking said links to said frame in the bracing position, an abutment on the tractor between said ramps adapted to press against said oscillatable locking member subsequent to the engagement of said rollers with said ramps so as to oscillate the locking member to release said links for folding, and a roller member carried by said links and adapted to be engaged and raised by said abutment to effect folding of said links and raising of the trailer front wheel subsequently to the said release of said links.

6. In a combined tractor and trailer, coupling mechanism comprising ramps on the tractor and runners on the trailer adapted to travel up said ramps, a foldable front wheel frame on the trailer, means for bracing said frame in the trailer supporting position, means for locking and releasing said bracing means, two abutments relatively movably carried by said frame and an abutment carried by the tractor adapted to successively engage the two abutments carried by the frame whereby the first engaged abutment of the trailer is actuated to unlock said bracing means and the other is engaged and actuated to effect folding of said bracing means.

7. Tractor and trailer coupling mechanism comprising three longitudinal bars on the tractor, three rollers on the trailer adapted to travel along said bars, the bars and the rollers being arranged in opposition and in triangular formation, two of said rollers being located either side of the longitudinal centre line of the trailer and adapted to travel along a correspondingly located pair of the said bars on the tractor, a foldable frame carrying a front wheel of the trailer and the remaining one of said three rollers, said latter roller being adapted to engage and travel along the centre of said three bars when the two vehicles are being coupled, means for locking the said frame in the supporting position, an abutment connected to said frame and adapted to be engaged by said center bar to effect unlocking of said frame, the arrangement being that the outer pair of said rollers travel along the outer pair of said bars in advance of the said abutment engaging said centre bar and the centre roller engaging and travelling along said centre bar, the latter engagement effecting a preliminary folding of the trailer wheel carrying frame off the ground.

OLIVER DANSON NORTH.
PERCY GARIBALDI HUGH.